W. AAB.
KEY CUTTING ATTACHMENT FOR LATHES.
APPLICATION FILED MAR. 13, 1915.
1,202,636.
Patented Oct. 24, 1916.
3 SHEETS—SHEET 1.
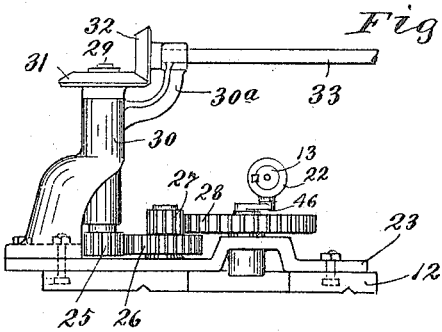
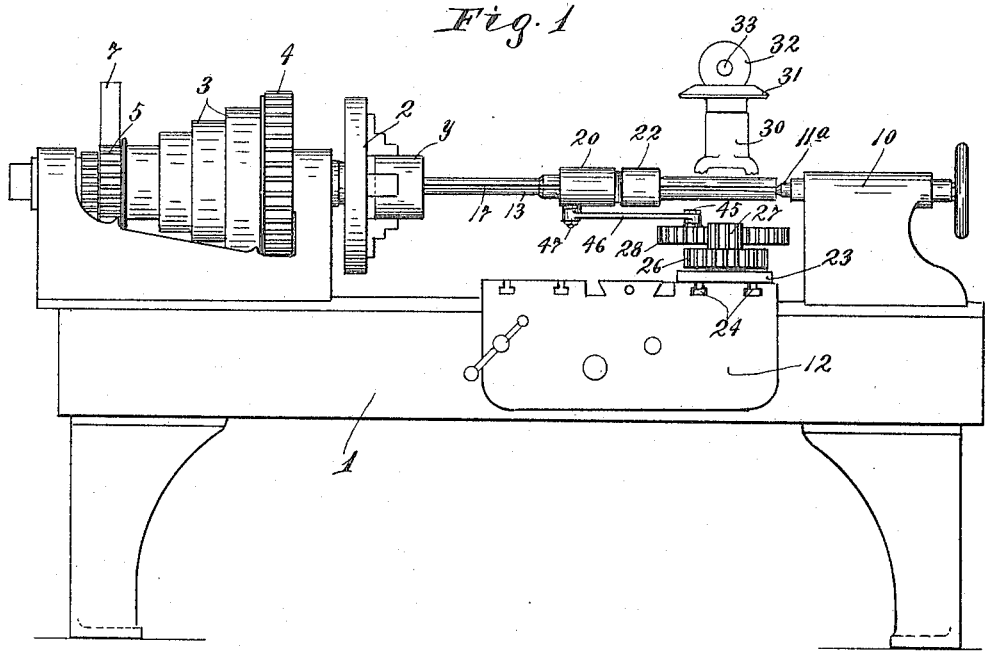
Witnesses.
A. H. Opsahl
E. C. Skinkle
Inventor.
William Aab.
By his Attorneys
Williamson Merchant

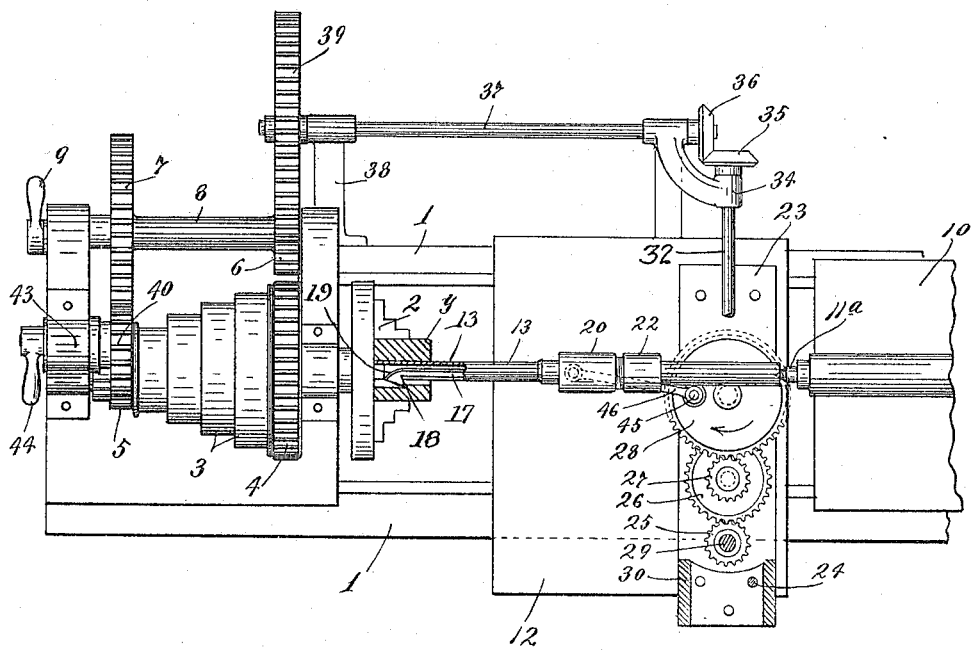

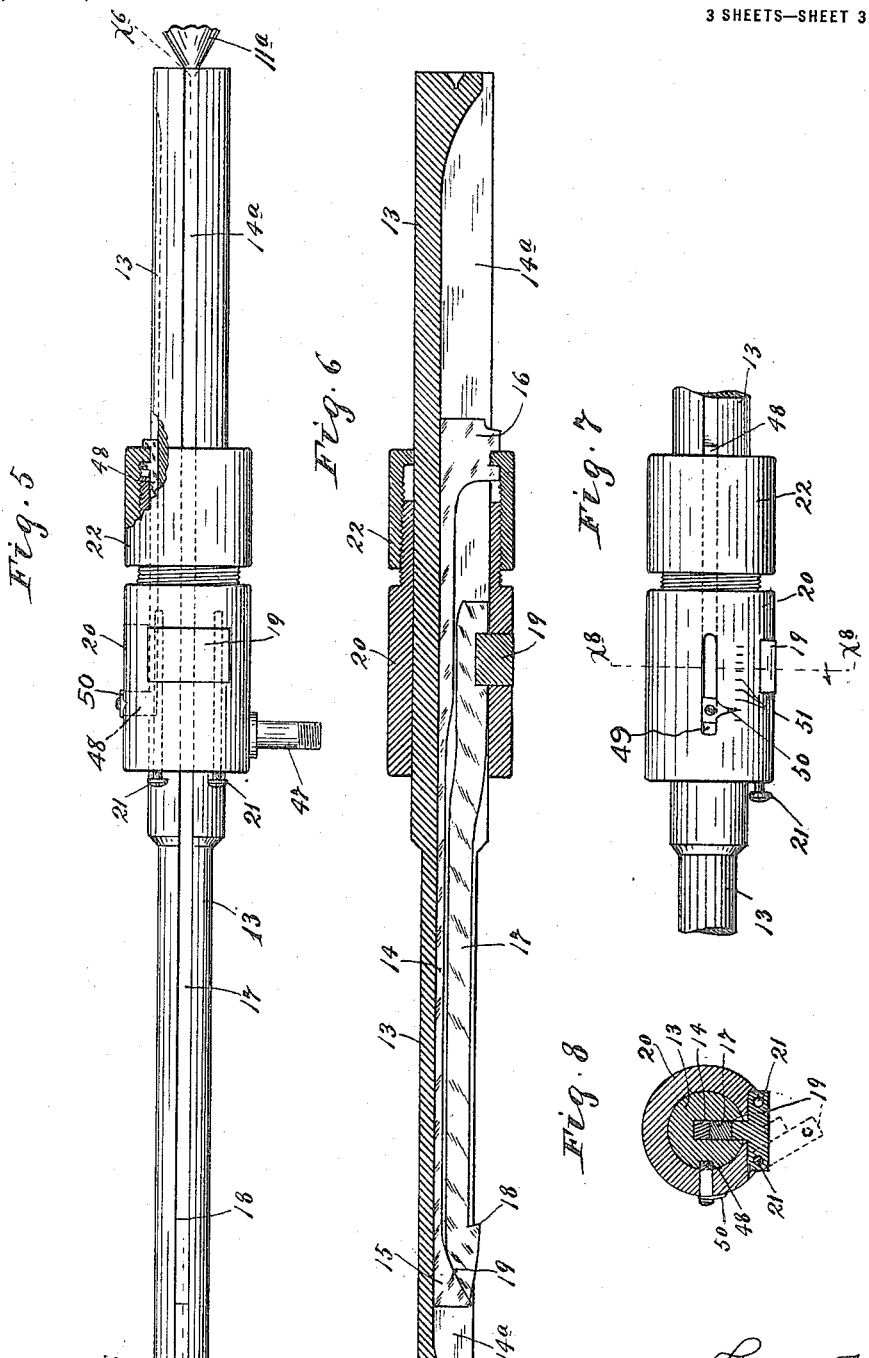

UNITED STATES PATENT OFFICE.

WILLIAM AAB, OF NEW ULM, MINNESOTA.

KEY-CUTTING ATTACHMENT FOR LATHES.

1,202,636.

Specification of Letters Patent.

Patented Oct. 24, 1916.

Application filed March 13, 1915. Serial No. 14,099.

*To all whom it may concern:*

Be it known that I, WILLIAM AAB, a citizen of the United States, residing at New Ulm, in the county of Brown and State of Minnesota, have invented certain new and useful Improvements in Key-Cutting Attachments for Lathes; and I do hereby declare the following to be a full, clear, and exact description of the invention, such as will enable others skilled in the art to which it appertains to make and use the same.

My invention has for its object to provide an improved key cutting attachment for lathes, and to such ends, generally stated, the invention consists of the novel devices and combination of devices hereinafter described and defined in the claims.

In accordance with my invention, by a peculiar attachment adapted for application to an ordinary lathe, means is provided for rapidly and efficiently cutting key seats in gears, pulleys, hubs, sleeves and the like. The article having the key seat to be cut therein is held in the lathe chuck, and the key cutting tool proper which is applied to, or incorporated in, sort of a non-rotary shaft, is adapted to be held on the lathe centers. Preferably, the key cutting tool is driven from the back gear of a lathe, and a speed drawn gear mechanism is mounted on the lathe carriage, and the slow moving gear thereof is connected to the key cutting tool by means of a crank which converts the rotary motion of said gear into a reciprocating movement of said cutting tool.

In the accompanying drawings which illustrate the invention, like characters indicate like parts throughout the several views.

Referring to the drawings, Figure 1 is a front elevation showing a lathe having my improved key cutting attachment applied thereto; Fig. 2 is a front elevation showing, particularly, the motion converting mechanism mounted on the lathe carriage; Fig. 3 is a plan view of the lathe and attachment, some parts being broken away; Fig. 4 is a front end elevation of the lathe with some parts broken away and some parts sectioned, and the teeth or some of the gears being shown in full and some being indicated only in diagram; Fig. 5 is a front elevation of the key cutting tool and its shaft; Fig. 6 is a horizontal section taken approximately on the line $x^6$ $x^6$ on Fig. 5; Fig. 7 is a plan view showing the central portion of the key cutting tool and shaft; Fig. 8 is a transverse section taken on the line $x^8$ $x^8$ on Fig. 7.

The lathe, as indicated, may be of the usual or any suitable construction, and of the parts thereof, it is only desirable, for the purposes of this case, to note the lathe bed or frame 1, the chuck 2, the step cone pulley 3, the ordinary lathe gears 4 and 5, the latter of which is connected to the cone pulley 3, and the former of which is adapted to be connected to and disconnected therefrom, at will, by the usual means.

The numerals 6 and 7 indicate the relatively small and large gears, and the numeral 8 indicates the connecting sleeve of the usual back gear mechanism, the same being subject to an eccentric operated by a crank 9 in the well known way, to throw the said gears 6 and 7 simultaneously into engagement with the gears 4 and 5 when the lathe chuck is to be driven at slow speed. The numeral 10 indicates the tail block of the lathe, and the numerals 11 and 11$^a$ indicate, respectively, the so-called live and dead centers, all of which parts are, or may be assumed to be of the standard lathe construction.

The cutting tool is best shown in detail in Figs. 5 to 8, inclusive. Of the parts thereof, the numeral 13 indicates the tool shaft which is adapted to be held by the lathe center 11 and 11$^a$ against both rotary and endwise movements, and, as shown, is of cylindrical form. The lathe carriage is indicated by the numeral 12. This shaft 13 is provided with a long deep groove 14$^a$ that extends nearly from end to end thereof and affords a runway for the cutting bar and the cam bar for adjusting the same. The said cam bar is indicated by the numeral 14, and at one end has a cam head 15, and at its other end a notched head 16. The cutting bar 17, at its cutting end, has a projecting cutting edge 18 and a cam surface 19, which latter bears against the cam surface 15. At its other end, the cutting bar 17 is notched to receive a heavy key or key block 19 that is seated in a peripheral opening of a driving head or sleeve 20, which latter is arranged to slide upon the tool shaft 13 and is held against rotation by a reduced portion of the said key block 19 that projects into the slot 14$^a$. As preferably constructed, the said key block 19 is T-shaped in cross section and laterally spaced anchoring pins 21 are passed through longitudinal seats in the driving head 20 and in the head of the said key block. When one of the pins 21 is removed, the key block may be moved pivotally on the other into an inoperative position shown by dotted lines in Fig. 8.

The notch in the head 16 of the cam bar 14 is engaged by the inturned annular flange of a tool adjusting sleeve 22 that has threaded engagement with the adjacent reduced end of the driving head 20.

Obviously, when the adjusting sleeve 20 is rotated, the cam bar 14 will be adjusted longitudinally, in respect to the cutting bar 17, and the cam head 20 thereof, will cause the cutting edge 18 of the cutting bar 17, to project more or less out of the slot $14^a$ of the tool shaft 13. In this way, as will hereinafter more clearly appear, the cutting edge of the key cutting bar may be progressively forced outward to cut the key seat in a gear, sleeve, hub, or similar article held in the lathe chuck. In Fig. 3, the sleeve $y$ is shown as held by the chuck 2 in position for the cutting of a key therein. When the key cutting attachment is to be applied to the lathe, the ordinary tool rest will usually be removed, and in lieu thereof, a gear-supporting base or plate 23 is applied to said lathe carriage, 12, being conveniently and rigidly anchored thereto by T-headed bolts 24. On this gear plate 23 is journaled a train of intermeshing gears 25, 26, 27 and 28. The said gears 26 and 27 are secured together on the same shaft, and they mesh, respectively, with the gears 25 and 28. They are of the size and arrangement which decreases the speed transmitted from the gear 25 to the gear 28. The said gear 25 is secured on the lower end of a short upright shaft 29 journaled in a bearing bracket 30 rigidly secured on one end of the plate 23. At its upper end, said shaft 29 has a beveled gear 31 that meshes with a beveled gear 32 secured on one end of a horizontal shaft 33. This shaft 33 is suitably journaled in an extended arm $30^a$ of the bearing bracket 30, and in one of the arms of a bearing bracket 34 that is secured in a fixed position, in respect to the lathe bed and is preferably directly secured to the back thereof. The shaft 33, at its rear end, is provided with a beveled gear 35 that meshes with a beveled gear 36 secured on the adjacent end of a counter shaft 37 that extends longitudinally of the lathe and is journaled in the bearing bracket 34 and in another bearing bracket 38, also preferably secured to the back of the lathe frame. At its front end, the shaft 37 has a larger spur gear 39 that has mesh with the back gear 6 when the back gears are thrown out of mesh with the lathe gears 4 and 5, respectively, as shown in Figs. 3 and 4.

In adapting the above described driving mechanism for application to the back gear of a lathe, an additional intermediate gear 40 is arranged to be thrown, at will, into mesh with the lathe gear 5 and back gear 7 when said gear 7 is thrown out of mesh with the said gear 5. This intermeshing gear 40 is loosely journaled on an eccentric 41 of a shaft 42 (see particularly Fig. 4) and which shaft is journaled in a bearing 43 applied on the head frame of the lathe. Also, the said shaft 42 is preferably provided with an operating lever 44, by the manipulation of which the said gear 40 may be readily moved to and from an operative position. It will, of course, be understood that when the lathe back gears 6 and 7 are engaged, respectively, with the lathe gears 4 and 5, the said intermeshing gear 40 must be thrown into an inoperative position, so as not to interfere with the ordinary operation of the lathe.

The above described slow moving gear 28 on the lathe carriage has a crank pin 45 that is connected by a crank rod or pitman 46 to a stud or wrist pin 47 that is rigidly secured to and depends from the tool driving head 20. It is desirable that an indicator be provided for determining the amount of outward projection given to the cutting edge of the cutting bar under adjustments of the sleeve 22. Preferably, this indicator is provided as follows: The numeral 48 indicates a small bar which works in a slot on the top of the tool shaft 13, and at its rear end, has a head formed with a notch in which the inwardly projecting annular flange of the tool adjusting sleeve 22 is arranged to work, so that the said indicator bar 48 will be given the same longitudinal movements as the cam bar 14. At its front or inner end, the indicator bar 48 has a radially projecting head that works through longitudinal slot 49 in the driving head 20 and terminates in a pointer 50 that works over graduation marks 51 shown as directly applied on the said head 20, and so spaced as to indicate the projection of the cutting edge of the tool above stated.

The operation of this improved cutting attachment is probably clear from the foregoing description. It is, of course, obvious that under rotation of the gear 28, the tool driving head 20 will be reciprocated on the tool shaft 13 and will carry with it both the cutting bar 17 and its adjusting bar 14, under which movements the said bars 17 and 14 maintain their relatively set adjustment. The relative set adjustments of the said bars 17 and 14, in respect to each other may, however, be varied at will, and without stopping the machine or interrupting the movements of the cutting tool, simply by giving the required step by step rotation to the adjusting sleeve 22 required to progressively force the cutting edge of the cutting bar outward, so that it will properly cut the key seat in the article y.

The working or cutting stroke of the cutting tool, in the arrangement described, is in a direction from the left toward the right, in respect to Figs. 1, 3, 5 and 6, and is produced by rotation of the gear 28 in the direction of the arrow marked thereon in Fig. 3. Here, it is important to note that the axis of the gear 28 is offset from a vertical plane, intersecting the axis of the tool shaft 13 and wrist pin 47, so that the greatest angularity of the connecting rod 46 will be on a return stroke, and the angularity thereof, under a working stroke, will be reduced to a minimum.

It should be understood that during the key cutting action the lathe carriage should be locked against sliding movements, so that it will afford the proper base of re-action for the reciprocating cutting tool. The lathe carriage may be thus locked in the well known manner, by locking it to the carriage feed screw while the latter is idle.

What I claim is:—

1. A key cutting attachment for lathes comprising a tool shaft adapted to be held on the lathe centers and having a longitudinal groove, a cutting bar and a coöperating cam bar mounted to slide in said groove, a driving head mounted to reciprocate on said shaft, a detachable connection between said driving head and cutting bar, and a sleeve having screw-threaded engagement with said driving head and having a flange connecting it to said cam bar.

2. The combination with a lathe, of a key cutting attachment therefor, comprising a cutting tool held for reciprocating movements longitudinally of the lathe, a rotary crank element on the lathe carriage connected to said tool by a crank rod, and means for rotating said crank element from one of the rotary elements of the lathe, the said crank element being set at one side of the longitudinal axis of movement of said cutting tool, so that said crank rod will be given a minimum angularity under cutting stroke, and a maximum angularity under return or idle stroke.

3. The combination with a lathe and a key cutting tool comprising a tool shaft and a cutting bar slidable thereon, and which shaft is adapted to be held by the lathe centers, of means for reciprocating said cutting bar, comprising gears mounted on the lathe carriage, means for driving one of said gears from certain of the lathe gears, and a crank connection between another of said gears on said lathe carriage and the reciprocating cutter bar of said tool.

4. The combination with a lathe having a back gear mechanism arranged to be thrown into and out of action, of an intermediate gear arranged to be thrown into mesh with one of the lathe spindle gears and with the said back gear, when the latter is thrown out of its lathe driving position, a key cutting tool held to reciprocate longitudinally of the lathe, a crank element on the lathe carriage, a crank rod connecting said crank element to said key cutting tool, and driving connections between the said lathe back gear and the crank element on said lathe carriage.

5. The combination with a lathe having a back gear mechanism arranged to be thrown into and out of action, of an intermediate gear arranged to be thrown into mesh with one of the lathe spindle gears and with the back gear, when the latter is thrown out of its lathe driving position, a key cutting tool held to reciprocate longitudinally of the lathe, a train of speed reducing gears supported on the lathe carriage, a crank connection between one of said gears and the said cutting tool, and driving connections between said lathe back gear and the said train of speed reducing gears.

6. The combination with a lathe having a back gear arranged to be driven both when in and when out of lathe driving position, of a key cutting tool comprising a tool shaft and a cutter bar slidably mounted thereon, which shaft is adapted to be held by the lathe centers on a train of speed reducing gears mounted on the lathe carriage, the slow gear of said train having a crank connection to said cutting bar, and driving connections between the said lathe back gear and the slow moving gear of said train.

In testimony whereof I affix my signature in presence of two witnesses.

WILLIAM AAB.

Witnesses:
ALBERT STEINHAUSER,
GEORGE D. ERICKSON.